Feb. 28, 1967  C. O. GLASGOW  3,306,106
HIGH PRESSURE LIGHT WEIGHT FLOAT
Filed June 4, 1964

INVENTOR.
CLARENCE O. GLASGOW
BY
Dunlap & Laney
ATTORNEYS

United States Patent Office 3,306,106
Patented Feb. 28, 1967

3,306,106
HIGH PRESSURE LIGHT WEIGHT FLOAT
Clarence O. Glasgow, 2627 S. Yorktown,
Tulsa, Okla. 74114
Filed June 4, 1964, Ser. No. 372,454
5 Claims. (Cl. 73—322.5)

This invention relates to a float of the type used to follow a liquid level by floating upon the surface thereof, and providing, through appropriate mechanical linkages connected to the float, an indication of the location of the surface of the liquid and/or the rate of change in its location. More particularly, but not by way of limitation, the present invention relates to an easily assembled, high pressure, light weight float which may be used for measuring fluid levels while withstanding pressures in excess of 2500 p.s.i.

Float devices depending upon Archimedes' principle of buoyancy for their operation, and used for supporting fishing nets, as navigational buoys, for actuating various types of liquid level control valves and energizing electrical systems in response to changes in liquid levels are well-known and are greatly varied in their construction. The great majority of these float devices are constructed of relatively thin metal, and in most instances, they are used under conditions of atmospheric pressure. In some instances, however, float devices must be utilized under conditions of superatmospheric pressure, such as in chemical storage tanks, steam condensation drums and other containers used in various chemical processes and in which pressures substantially in excess of atmospheric pressure must be constantly maintained. In these circumstances, unless the float structures, which are usually hollow bodies of some type, are initially filled with a fluid which is itself placed within the float under superatmospheric pressure, the float must be constructed with sufficiently high mechanical strength to withstand the tendency of the external pressure to crush or collapse the float. This construction requires the use of heavier gauge metal, a laminated metal construction, such as is disclosed in Osborn U.S. Patent 1,577,145, or the use of more exotic high strength metals, particularly in cases where the external pressures are very high, such as pressures exceeding 1000 p.s.i. The problem of high strength construction is further complicated in situations where the liquid upon which the float is to rest is a corrosive substance, and many metals are eliminated from consideration by virtue of their susceptibility to corrosive attack.

The present invention provides a novel, lightweight, corrosion resistant, high pressure float which is inexpensive to construct and may be assembled for use quickly and easily. In a preferred construction of the invention, the material used in fabricating the float of the invention is a corrosion resistant plastic, such as high density polyethylene, or more preferably, where corrosion is a problem, one of the polyhalohydrocarbon plastics, such as Teflon or Kel-F.

The float of the invention is, broadly described, a three-part structure comprising two generally hemispherical and preferably obrotund, float halves and a centrally positioned reinforcing member which extends transversely across the float, partitioning the float into two substantially equi-volume chambers, and terminating with its peripheral edge in juxtaposition to the aligned, adjacent ends of the obrotund float halves. Each of the obrotund float halves is provided with an axially extending, tapered columnar portion which terminates in a plane containing the transversely extending, centrally positioned reinforcing member. The two tapered columnar portions are joined through the use of a suitable securing means so that when the float is in its assembled status, collapse of the float is prevented by the centrally positioned, transversely extending reinforcing member, and by the tapered columnar portions which extend normal to the centrally positioned reinforcing member.

The obrotund float halves are, in a preferred embodiment of the invention, molded of plastic and are identical in shape. The centrally positioned reinforcing member which is employed carries a plurality of apertures to reduce the overall weight of the float and is used for aligning the float halves during the assembling of the float, as well as to provide reinforcement and structural strength. It is further preferred to mold a connecting member, such as a threaded metallic stud, in the tapered columnar portion of one of the float halves during the plastic molding operation, and to provide the other tapered columnar member with a threaded bore for receiving the projecting end of the threaded stud when the two float halves are assembled in juxtaposition to each other. The centrally positioned reinforcing member is centrally apertured to permit the free ends of the tapered columnar portions of each obrotund float half to meet in end-to-end abutting relation in the center of the centrally positioned reinforcing member. This construction of the float of the invention facilitates rapid and easy assembly of the device so that it may be manufactured inexpensively and quickly.

From the foregoing description of the invention, it will be perceived that an object of the present invention is to provide a high pressure, lightweight float which is characterized in having great mechanical strength to withstand exceedingly high external pressures, and yet which is of light weight and inexpensive construction.

An additional object of the present invention is to provide a three-part, high pressure float device which may be quickly and easily assembled by personnel having relatively little technical skill.

A further object of the present invention is to provide a high pressure float device which is resistant to attack by corrosive chemicals, and which is characterized by a long and trouble-free operating life.

In addition to the foregoing described objects of the invention, additional objects and advantages will become apparent as the following detailed description of the invention is read in conjunction with a perusal of the accompanying drawings which illustrate my invention.

Figure 1:
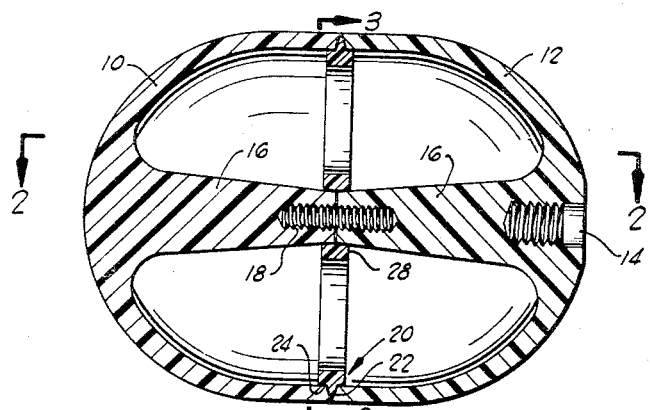
FIGURE 1 is a sectional view taken through the center of one embodiment of the float of the invention, said sectional view being taken along a vertical plane which passes through the longitudinal axis of the float.

Referring now to the drawings in detail, reference characters 10 and 12 designate two obrotund float halves which are substantially identical in geometrical configuration except for the location in the end of the float half 12 of a tapped bore 14 which is provided to facilitate connection of the float to a lever arm, or other mechanical or electrical control instrumentality.

Each of the float halves 10 and 12 is generally hemispherical, and more specifically, slightly obrotund, in configuration. In the preferred configuration of the float, the float is actually a prolate spheroid in configuration, this geometric configuration being generated by the rotation of an ellipse about its major axis. Each float includes an axially extending tapered columnar portion which, in the case of each of the float halves, has been commonly designated by reference character 16. The tapered columnar portions 16 are coextensive in length with the overall dimension of each float half as measured from its rounded end portion to the imaginary plane which contains the free edge of each float half. In other words, when the float halves 10 and 12 are aligned and placed in contact with each other in the manner illustrated in FIGURE 1, both the external free edges of the float halves will be in abutting contact, and the tapered columnar portions 16 of each float half will also be in contact.

As has been previously indicated, it is preferred to mold the float halves 10 and 12 of plastic. If such preferred construction is adopted, the tapered columnar portions 16 are preferably connected to each other by molding a threaded stud 18 into one of the tapered columnar portions, and providing a threaded bore for receiving the protruding end of the stud in the tapered columnar portion 16 of the other float half.

Figure 2:
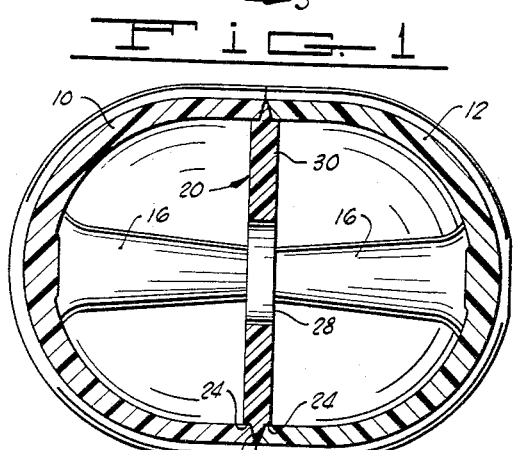
FIGURE 2 is a view in section taken along line 2—2 of FIGURE 1.

A transverse reinforcing member 20 is positioned internally in the float in the position shown in FIGURES 1 and 2 so that the transverse reinforcing member 20 extends substantially normal to the tapered columnar portions 16. The transverse reinforcing member 20 is disc-shaped in configuration and its circular periphery is substantially equal in diameter to the diameter measured transversely through the float halves 10 and 12.

Figure 3:
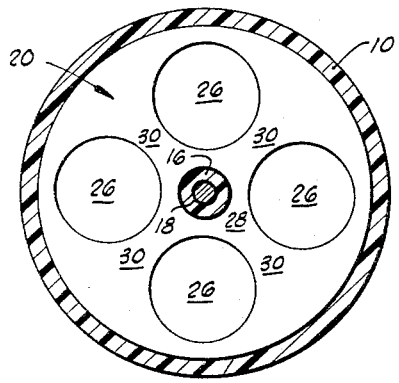
FIGURE 3 is a view in section taken along line 3—3 of FIGURE 1.

The precise construction of a preferred form of the transverse reinforcing member 20 can be best understood by reference to FIGURES 1 and 3 of the drawings. In referring to these views of the drawings, it will be perceived that a tapered lip 22 is provided around the outer periphery of the transverse reinforcing member 20 and originates at two spaced axially extending shoulders 24 formed on the transverse reinforcing member 20 on opposite sides of the tapered lip 22. The tapered lip 22 and shoulders 24 mate with the beveled free edges of the float halves 10 and 12 so that a smooth external peripheral surface of the float device is formed when the float is assembled as shown in FIGURES 1 and 2.

To reduce the overall weight of the float, a plurality of large apertures 26 are formed in the transverse reinforcing member 20 with the size and location of the apertures being such that the central portion 28 of the disc-shaped transverse reinforcing member 20 remains connected to the peripheral portion thereof by a plurality of web portions 30. The central portion 28 of the disc-shaped, transverse reinforcing member 20 is apertured to accommodate the ends of the tapered columnar portions 16 of each of the float halves 10 and 12. It is preferred that the aperture through the central portion 28 of the disc-shaped reinforcing member 20 have a reverse, or V-shaped, taper as best shown in FIGURE 1 so that a relatively snug fit of the two abutting tapering columnar portions 16 may be attained.

In order to assemble the three-part float of the invention, one of the float halves 10 or 12 is first fitted with the disc-shaped transverse reinforcing member 20 by mating the tapered lip 22 with the free edge of the float half, and placing the apertured central portion 28 over the tapered columnar portion 16 of the respective float half so that the columnar portion terminates inside the aperture through the central portion 28. In so positioning the disc-shaped, transverse reinforcing member 20, a suitable adhesive is placed on the side of the tapered lip 22 which contacts the float half so as to provide a fluid tight seal between the transverse reinforcing member 20 and the respective float half. If desired, adhesive may also be placed on the tapered columnar portion 16 where it contacts the central portion 28 of the disc-shaped transverse reinforcing member 20.

In the second step of the assembly of the float, a suitable adhesive is placed on the exposed side of the tapered lip 22, and the second float half is then screwed downwardly on the threaded stud 18 until the free ends of the tapered columnar portions 16 of the float halves 10 and 12 are in abutting contact with each other. When the tapered columnar portions 16 of the two float halves 10 and 12 are in abutting contact, the free edge of the second float half abuts against the tapered lip 22 and is bonded thereto by the adhesive. A fluid tight seal is thus formed between the tapered lip 22 and the second float half in the same manner as such seal is formed between the tapered lip 22 and the first float half which is placed in contact therewith. After allowing time for the adhesive to set up and become firmly bonded to the contacting members of the structure, the float of the invention is ready for utilization in following the surface of a liquid. A suitable lever arm may be threaded at one of its ends into the tapped bore 14 and connected at its other end to a suitable control mechanism or other instrumentation which is to be made responsive to changes in the level of the liquid which buoyantly supports the float.

From the foregoing description of the invention, it is believed that it will be readily perceived that the present invention provides a novel, light weight, yet very strong float device which can be used in an environment and under conditions such that the float is subjected to very high external pressures. The float's preferred plastic construction reduces the overall weight of the float, permits the float halves to be easily molded and permits the float to be constructed of a corrosion resistant material.

Although a preferred embodiment of the invention has been described in the foregoing discussion in order to provide an example of one construction which may be used in practicing the invention, it will be readily apparent that numerous changes may be made in this preferred embodiment without departing from the basic principles which underlie the invention. Thus, other types of interconnecting means than the threaded stud which is used to join the tapered columnar portion 16 may be employed, and it is also possible in less preferred embodiments of the invention to use a transverse reinforcing member which does not carry a tapered lip 22 at its outer edge, but which merely extends to the inner periphery of the float halves 10 and 12 and is bonded at this point to the float halves. Other modifications and innovations which do not entail alterations in the basic concepts of the invention will suggest themselves to those skilled in the art. Insofar as these modifications and changes in construction continue to rely upon the basic principles of the invention as hereinbefore outlined, such changes are deemed to be circumscribed by the spirit and scope of the invention except as the same may be necessarily limited by the appended claims or reasonable equivalents thereof.

What is claimed is:

1. A float device comprising:

two mating plastic float halves of generally hemispherical shape;

a columnar portion extending along the axis of each of said generally hemispherically shaped float halves and secured at one of its ends to the respective float half, said columnar portions each being substantially conterminous with the respective float half to which it is secured;

a threaded stud threaded into the adjacent ends of said columnar portions for securing said columnar portions in end-to-end abutting contact to join said float halves and form a generally spherically shaped float; and means reinforcing said spherically shaped float against collapse by external superatmospheric pressure.

2. A float device comprising:

two mating float halves which together form a prolate spheroid configuration;

two part columnar means extending from one side of the mating float halves to the other to join said float halves together, said columnar means lying in the equatorial plane of said prolate spheroid and comprising:

a first columnar portion secured as a cantilever at one of its ends to one of said float halves and terminating at its free other end in a plane containing the minor axis of the ellipse constituting the figure of revolution from which said prolate spheroid is generated;

a second columnar portion secured as a cantilever at one of its ends to the other of said float halves and terminating at its free other end in a plane containing the minor axis of the ellipse constituting the figure of revolution from which said prolate spheroid is generated; and means for engaging the free ends of said columnar portions to bring said float halves into mating engagement and said columnar portions into alignment along the major axis of said elliptical figure of revolution; and disc-shaped reinforcing means surrounding and bearing against parts of each of said columnar portions and extending in a plane occupied by said minor axis, said reinforcing means bearing at its outer periphery against portions of each of said float halves whereby said mated float halves are reinforced against collapse by forces acting in either of two planes extending normal to each other.

3. A float device comprising:
two mating float halves of generally hemispherical shape;
a columnar portion extending along the axis of each of said generally hemispherically shaped float halves and secured at one of its ends to the respective float half, said columnar portions each being substantially conterminous with the respective float half to which it is secured;
means threadedly engaging the free ends of said columnar portions to each other in end-to-end abutting contact to join said float halves and form a generally spherically shaped float; and
means reinforcing said spherically shaped float against collapse by external superatmospheric pressure.

4. A float device comprising:
two mating float halves, each having the configuration of a hemi-prolate spheroid, and mated to form a prolate spheroid in said float device;
two part columnar means extending from one side of the mated float halves to the other to join said float halves together, said columnar means lying in the equatorial plane of said prolate spheroid and comprising:

a first columnar portion secured as a cantilever at one of its ends to one of said float halves and terminating at its free other end in a plane containing the minor axis of the ellipse constituting the figure of revolution from which said prolate spheroid is generated, said first columnar portion having a gradually diminishing transverse dimension from its end secured to said one float half to its free end;

a second columnar portion secured as a cantilever at one of its ends to the other of said float halves and terminating at its free other end in a plane containing the minor axis of the ellipse constituting the figure of revolution from which said prolate spheroid is generated, said second columnar portion having a gradually diminishing transverse dimension from its end secured to said one float half to its free end; and means for engaging the free ends of said columnar portions to bring said float halves into mating engagement and said columnar portions into alignment along the major axis of said elliptical figure of revolution; and reinforcing means surrounding and bearing against parts of each of said columnar portions adjacent the free ends of said columnar portions, said reinforcing means extending in a plane normal to the equatorial plane of said prolate spheroid and having an aperture therein receiving the end portions of each of said columnar portions and dimensioned to prevent movement of said reinforcing means along either of said columnar portions away from the free end thereof, said reinforcing means further having a peripheral portion contacting at least one of said float halves.

5. A float device comprising:
two mating float halves which together form a prolate spheroid configuration;
two part columnar means extending from one side of the mated float halves to the other to join said float halves together, said columnar means lying in the equatorial plane of said prolate spheroid and comprising:

a first columnar portion secured as a cantilever at one of its ends to one of said float halves and terminating at its free other end in a plane containing the minor axis of the ellipse constituting the figure of revolution from which said prolate spheroid is generated;

a second columnar portion secured as a cantilever at one of its ends to the other of said float halves and terminating at its free other end in a plane containing the minor axis of the ellipse constituting the figure of revolution from which said prolate spheroid is generated; and means for engaging the free ends of said columnar portions to bring said float halves into mating engagement and said columnar portions into alignment along the major axis of said elliptical figure of revolution; and disc-shaped reinforcing means surrounding part of said columnar means and bearing thereagainst, said disc-shaped reinforcing means extending in a plane occupied by said minor axis, said reinforcing means including a peripheral portion carrying a tapered lip projecting between the free ends of each of said float halves, and said peripheral portion bearing against portions of each of said float halves whereby said mated float halves are reinforced against collapse by forces acting in either of two planes extending normal to each other.

References Cited by the Examiner

UNITED STATES PATENTS

| | | | |
|---|---|---|---|
| 795,870 | 8/1905 | Voelke | 73—322.5 |
| 855,659 | 6/1907 | O'Brien | 73—322.5 |
| 998,279 | 7/1911 | Cookson | 73—322.5 |
| 2,358,472 | 9/1944 | Owens | 73—322.5 |
| 2,415,692 | 2/1947 | Huston | 73—322.5 X |

LOUIS R. PRINCE, *Primary Examiner.*

D. M. YASICH, *Assistant Examiner.*